Jan. 8, 1952

W. H. BASELT 2,581,746

RAILWAY BRAKE

Filed July 28, 1948

INVENTOR.
Walter H. Baselt
BY
Orin O. B. Garner
Atty.

Patented Jan. 8, 1952

2,581,746

UNITED STATES PATENT OFFICE 2,581,746

RAILWAY BRAKE

Walter H. Baselt, Flossmoor, Ill., assignor to American Steel Foundries, Chicago, Ill., a corporation of New Jersey Application July 28, 1948, Serial No. 41,090

31 Claims. (Cl. 188—59)

This invention relates to railway brake equipment and more particularly to a type incorporating wheel tread brakes and off wheel brakes in combination.

The general object of the invention is to provide a novel railway brake in which the braking action is distributed between the tread surfaces of the wheels of an associated wheel and axle assembly and one or more discs carried by said assembly.

A more specific object is to provide such a brake wherein the wheel tread shoes may have metal-to-metal braking surfaces and the off wheel shoes may be formed of composition material whereby a more uniform braking action is obtained under all speeds.

A further object is to devise a practical, compact, rugged and efficient brake suitable for present day service requirements.

A different object is to devise a combination brake, such as above described, which is actuated by common power means.

Another object is to provide a novel form of brake rigging wherein single shoe brake means may be utilized for the tread brakes and stators may be used for the disc.

These and other objects of the invention will become more apparent from the specification and the drawings wherein, in certain views, certain parts may be omitted where more clearly shown in other views.

Figure 1:
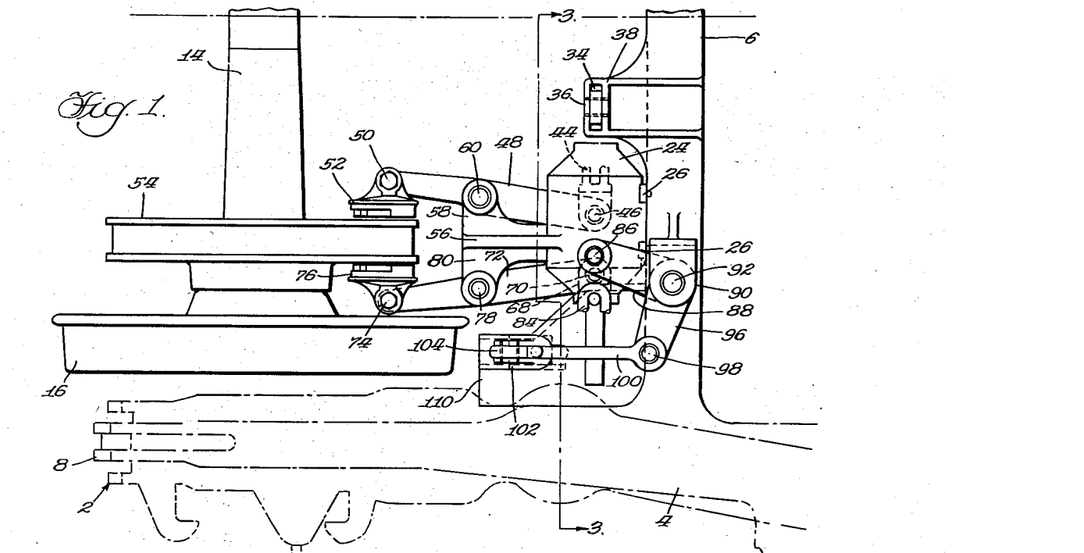
Figure 1 is a fragmentary top plan view of one quarter of a railway car truck incorporating one form of the invention. It will be understood that the truck is arranged in a similar manner at opposite sides and opposite ends thereof.
Figure 2:
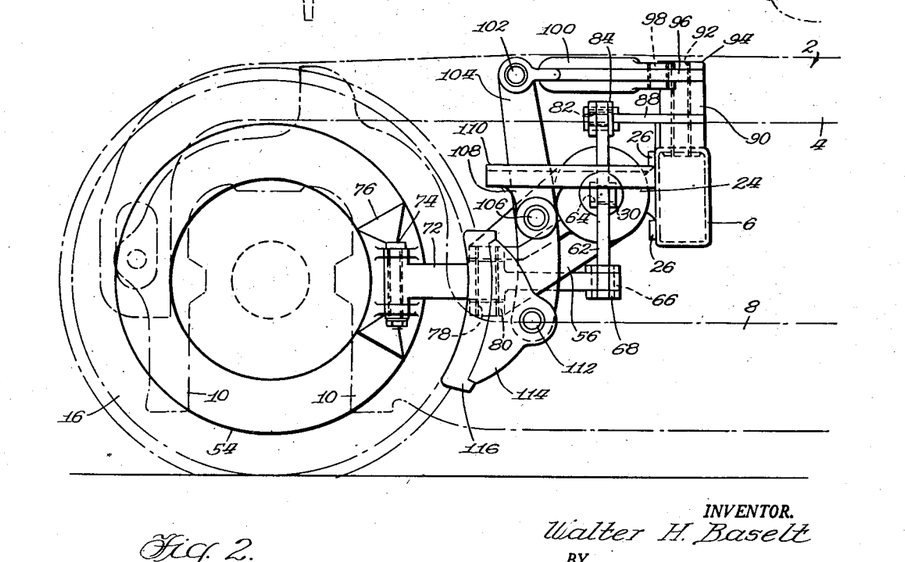
Figure 2 is a side view of Figure 1.
Figures 3, 6:
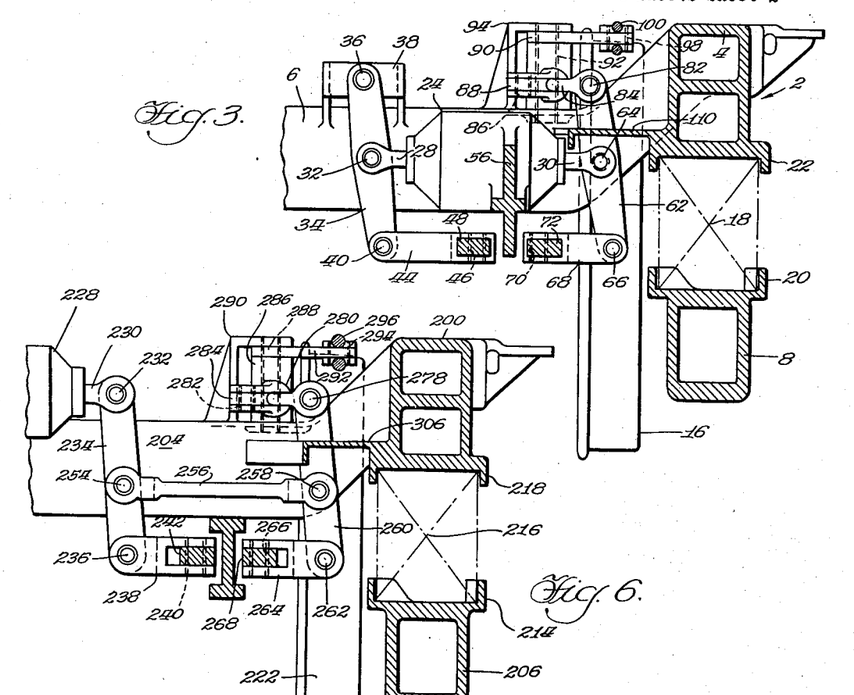
Figure 3 is a sectional view of Figure 1 taken substantially in the transverse vertical planes indicated by the line 3—3 of Figure 1.
Figure 6 is a sectional view taken substantially in the transverse vertical planes as indicated by the line 6—6 of Figure 4.

Describing the invention in detail and referring to the embodiment illustrated in Figures 1 to 3, the railway car truck, generally designated 2, comprises a frame structure including a side rail 4 at each side thereof extending longitudinally of the truck and an integral transom 6 at each side of the transverse center line of the truck extending transversely of the side rail and integral therewith. An equalizer 8 is provided at each side of the truck, said equalizer being formed at each end thereof with spaced pedestals 10, 10 affording a convenient connection for journal means (not shown) of an associated wheel and axle assembly, comprising an axle 14 with a wheel 16 adjacent each end thereof.

The truck frame is supported from each equalizer 8 by spring means 18, diagrammatically illustrated in Figure 3, disposed between spring seats 20 and 22 formed on the associated equalizer 8 and the adjacent side rail 4, respectively.

A power device or cylinder 24 is secured to the transom 6 adjacent one end thereof, preferably, as by bolts 26, 26 on the side of the transom adjacent the wheel and axle assembly 14—16. The cylinder 24 is of a double-acting type including piston stems 28 and 30 extending from opposite ends thereof and arranged to act substantially parallel to the transom 6.

The stem 28 is pivoted as at 32 to a substantially vertically disposed cylinder or auxiliary lever 34 intermediate the ends thereof. The upper end of lever 34 is pivoted as at 36 to a bracket 38 which preferably and as shown is formed as an integral part of transom 6. The lower end of lever 34 is pivoted as at 40 to one end of a jaw member or fulcrum 44, the opposite end of said jaw member 44 being pivoted as at 46 to the inner end of a generally horizontally disposed dead lever 48 which at its opposite or outer end pivotally carries as at 50 a brake head and shoe assembly or stator 52, arranged to engage the adjacent side of a rotor or disc 54 carried by the associated wheel and axle assembly in conventional manner, as will be readily understood by those skilled in the art.

A support 56 or fulcrum bracket extending below the lower level of cylinder 24 and formed preferably integral therewith is provided with a jaw 58 affording a pivotal connection as at 60 on a substantially vertical axis for lever 48 intermediate the ends thereof.

The piston stem 30 of cylinder 24 is pivotally connected to a substantially vertically disposed cylinder, auxiliary or operating lever 62 intermediate the ends thereof as at 64, the lower end of said lever 62 being pivoted as at 66 to one end of a jaw member or fulcrum 68, the opposite end of which is pivoted as at 70 to the inner end of a generally horizontally disposed lever 72, at the opposite or outer end of which is pivotally mounted as at 74 a brake head and shoe assembly or stator 76 arranged to cooperate with the opposite side of rotor 54. The lever 72 is pivoted as at 78 intermediate its ends to a jaw portion 80 which is formed as part of support 56. It will be noted that levers 48 and 72 are disposed at approximately the level of the axle 14 and below cylinder 24 and transom 6.

The upper end of lever 62 is pivotally connected as at 82 to clevis means 84, said clevis means being pivotally connected as at 86 to the lower substantially horizontal leg 88 of a bell crank, elbow or frame lever 90, said elbow lever 90 being substantially horizontally disposed and being pivotally connected intermediate its ends at its elbow on a substantially vertical axis as at 92 to a bracket 94 which is preferably formed as shown herein on the top side of transom 6. The other or upper substantially horizontal leg 96 of lever 90 is angularly related to leg 88 and is pivoted at its outer extremity as at 98 to one end of clevis means 100, the opposite end of said clevis means being connected as at 102 to the upper end of a substantially vertical dead truck lever 104 disposed at the inner side of the associated wheel 16. Lever 104 is pivoted intermediate its ends as at 106 from a bracket 108 formed as part of a web 110 extending between the transom 6 and side rail 4 and integral therewith. The lower end of lever 104 is pivoted as at 112 to a brake head 114 carrying a brake shoe 116 arranged to engage the periphery or tread of the associated wheel 16 of assembly 12.

In operation, actuation of power cylinder 24 causes movement of piston stem 28 to the left (Figure 3) thus pivoting the lever 34 in a clockwise direction about point 36, causing the fulcrum member 44 to move to the left and the lever 48 to pivot about point 60 in a counterclockwise direction (Figure 1), applying the friction means or stator 52 to the adjacent side of the rotor 54. Simultaneously, piston stem 30 is caused to move to the right (Figure 3), moving lever 62 and fulcrum 68 to the right, causing lever 72 to pivot about point 78 (Figure 1) in a clockwise direction, applying friction means or stator 76 to the rotor 54. The lever 62 also pulls leg 88 to the right (Figure 3) and fulcrums at point 66, rotating in a clockwise direction (Figure 3), thus causing the bell crank 90 to rotate in a counterclockwise direction (Figure 1) and thus moving the leg 96 thereof and the clevis means 100 to the right (Figure 1), causing the lever 104 to pivot about point 106 in a clockwise direction (Figure 2), applying the brake shoe 116 against the tread of the associated wheel 16.

Figure 4:
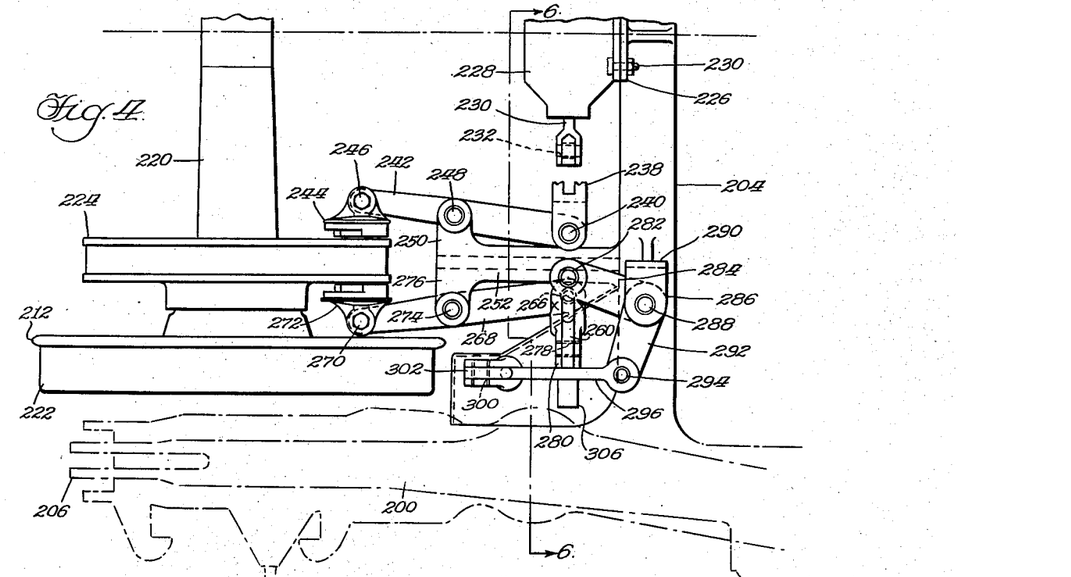
Figure 4 is a view similar to Figure 1, illustrating another embodiment of the invention.
Figure 5:
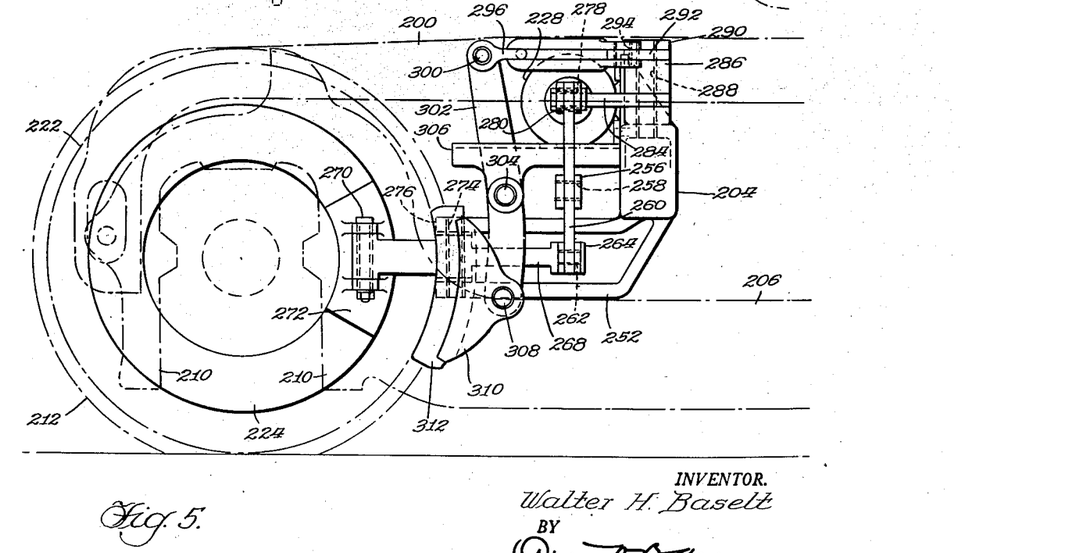
Figure 5 is a side view of Figure 4.

Referring now to Figures 4 to 6, inclusive, the truck includes a frame structure comprising a side rail 200 at each side thereof extending longitudinally of the truck and a transom 204 at each side of the transverse center line of the truck, said transom 204 extending transversely of the truck and merging at each end thereof with the associated side rail 200. The transoms are formed and arranged to suport a bolster (not shown) therebetween, as will be readily understood by those skilled in the art. The truck is also provided at each side thereof with an equalizer 206 provided with pedestals 210, 210 at each end thereof affording a conventional journal connection for an associated wheel and axle assembly, generally designated 212, as will be readily understood by those skilled in the art. The equalizer is provided with a spring seat 214 at each end thereof affording a seat for spring means 216, diagrammatically illustrated in Figure 6. The upper ends of said spring means seat against a spring seat 218 formed on the associated side rail 200.

The wheel and axle assembly 212 includes an axle 220 with a wheel 222 press-fitted thereon adjacent each end thereof. The wheel and axle assembly also includes a rotor or brake disc 224 carried by the assembly adjacent each wheel in conventional manner.

The transom 204 is provided with a bracket at substantially the longitudinal center line of the truck, sad bracket including a mounting plate 226 disposed on the side of the transom facing the wheel and axle assembly 212.

A power device or air cylinder device 228 is secured to the mounting plate 226 as by bolts 230 (Figure 4). It will be understood that the plate 226 is part of the transom. The cylinder device 228 includes a piston stem 230 at each end thereof acting transversely of the truck. The stem 230 is pivoted as at 232 to the upper end of a substantially vertically disposed auxiliary or cylinder lever 234, the lower end of said lever 234 being pivoted as at 236 (Figure 6) to one end of a jaw member or fulcrum 238, the opposite end of which is pivoted as at 240 to the inner end of a substantially horizontally disposed dead lever 242. A brake head and shoe assembly or stator 244 is pivoted as at 246 to the opposite or outer end of lever 242 and is arranged to engage the adjacent side of the related rotor 224. Lever 242 is pivoted intermediate its ends on a substantially vertical axis as at 248 to a jaw 250 of a support member or fulcrum bracket 252 which is formed integral with the transom 204.

Lever 234 is pivoted intermediate its ends as at 254 to one end of a compression rod 256, the opposite end of which is pivoted as at 258 to a substantially vertically disposed auxiliary or operating lever 260 intermediate the ends thereof. The lower end of lever 260 is pivoted as at 262 to one end of a jaw member or fulcrum 264, the opposite end of said fulcrum being pivoted as at 266 to the inner end of a generally horizontally disposed dead lever 268, the opposite or outer end of said dead lever 268 being pivotally connected as at 270 to a stator or brake head and shoe assembly 272 arranged to cooperate with the adjacent side of the related rotor 224. The lever 268 is pivoted intermediate its ends on a substantially vertical axis as at 274 to a jaw 276 formed as part of the before-mentioned support bracket or member 252. It will be noted that levers 242 and 268 are positioned at approximately the level of axle 220.

The upper end of lever 260 is pivoted as at 278 to one end of a clevis means 280, the opposite end of said clevis means being pivoted as at 282 to a substantially horizontally disposed lower arm 284 of a bell crank, elbow or frame lever, generally indicated 286, said bell crank lever being pivoted intermediate its ends on a substantially vertical axis as at 288 to a bracket 290 formed on top of the associated transom 204. The bell crank 286 is provided with another or upper arm 292, angularly related to arm 284 and generally horizontally disposed and pivoted as at its outer extremity as at 294 to one end of a clevis means 296, the opposite end of said clevis means being pivoted as at 300 to the upper end of a substantially vertically arranged dead truck lever 302 pivoted intermediate its ends as at 304 to a bracket 306 formed as an integral part of the associated side rail 200 and transom 204. The lower end of lever 302 is pivoted as at 308 to a brake head 310 carrying a brake shoe 312 adapted for engagement with the periphery of the associated wheel 222 of the wheel and axle assembly 212.

It will be understood that the arrangement last described is preferably duplicated on the other side of the longitudinal center line of the truck.

In operation, actuation of cylinder 228 causes the stem 230 to move to the right (Figure 6), moving lever 234, rod 256, and lever 260 to the right. Lever 260, in moving to the right, moves clevis means 280 and fulcrum 264 to the right, causing lever 268 to pivot about point 274 in a clockwise direction (Figure 4), applying stator 272 to the rotor 224. As soon as stator 272 is applied, movement of levers 234 and 260 to the right terminates and lever 234 is caused to pivot in a clockwise direction (Figure 6) about point 254, moving fulcrum 238 to the left and rotating lever 242 about point 248 in a counterclockwise direction (Figure 4) and applying stator 244 against rotor 224. At the same time, lever 260 is caused to rotate about point 262 in a clockwise direction (Figure 6) through the action of rod 256 moving to the right (Figure 6). The clevis means 280 are thus pulled further to the right, rotating the bell crank 286 about point 288 in a counterclockwise direction (Figure 4) whereby leg 292 of lever 286 is moved to the right (Figure 4), and the clevis means 296 are also caused to move to the right (Figure 4), whereby lever 302 is caused to rotate about point 304 in a clockwise direction (Figure 5), thereby engaging the shoe 312 with the periphery of the associated wheel. It will be apparent that similar action takes place simultaneously at the opposite side of the truck.

Figure 7:
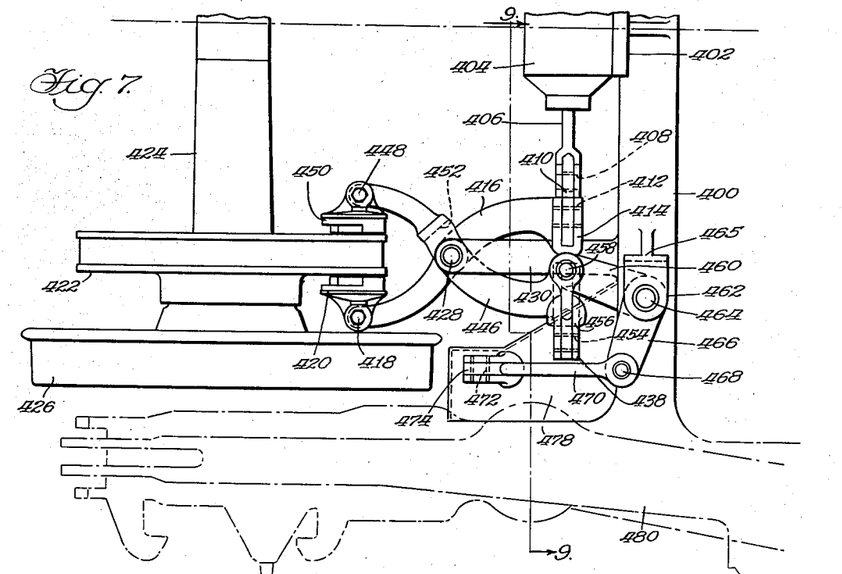
Figures 7 to 9 illustrate a further modification of the invention, Figure 7 being a top plan view similar to Figure 1, Figure 8 being a side view of Figure 7, and Figure 9 being a sectional view taken substantially in the transverse vertical planes as indicated by the line 9—9 of Figure 7.
Figure 8:
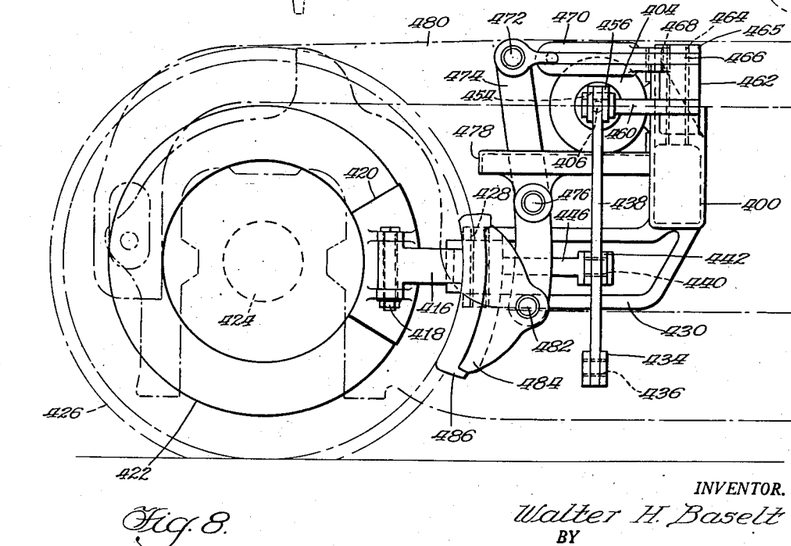
Figure 9:
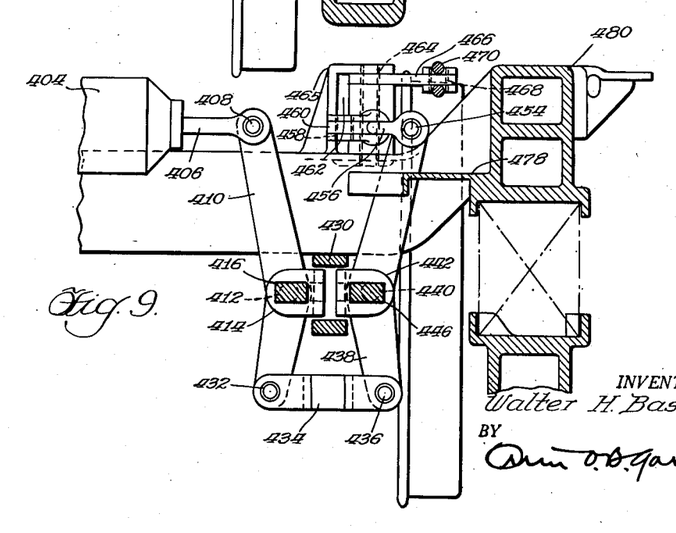

Referring now to Figures 7 to 9, inclusive, the truck structure is generally similar to that illustrated in connection with the two described embodiments of the invention and includes a transom 400 adjacent each side of the transverse center line of the truck, each transom being provided with a mounting bracket 402 at approximately the longitudinal center line of the truck, to which is secured a power device or air cylinder 404 which may be of the double-acting type, said cylinder including a piston stem 406 at each end thereof, each stem being pivoted as at 408 to the upper end of a substantially vertically disposed auxiliary or cylinder lever 410. The cylinder lever 410 is pivoted intermediate its ends as at 412 to a jaw 414 provided at the inner end of a substantially horizontally arranged dead lever 416 shaped in the form of an elongated S. The opposite or outer end of lever 416 is afforded a pivotal connection as at 418 to a stator 420 arranged to cooperate with a brake rotor or disc 422 mounted on a wheel and axle assembly 424, said assembly 424 also including an axle with a wheel 426 at each end thereof. Lever 416 is pivoted intermediate its ends on a substantially vertical axis as at 428 to a support bracket 430 formed as an integral part of the associated transom 400.

Lever 410 is pivoted at its lower end as at 432 to one end of a jaw member or connector 434 underlying support 430, the opposite end of said connector being pivoted as at 436 to the lower end of a substantially vertically disposed auxiliary or operating lever 438. The lever 438 is pivoted as at 440 intermediate its ends to a jaw 442 formed at the inner end of a substantially horizontally disposed dead lever 446 which also is in the form of an elongated S. Lever 446 is afforded a pivotal connection at its opposite or outer end as at 448 to a stator 450 arranged to cooperate with the adjacent side of the related rotor 422. Lever 446 is also pivoted as at 428 and about the point of pivot 428 is provided with a slot 452 through which extends the before-mentioned lever 416. It will be noted that levers 416 and 446 are afforded a common pivot 428 and are disposed in a tong arrangement. It will be understood that the levers 416 and 446 may be arranged in superposed relation and/or may be pivoted on different axes; however, the arrangement shown is simple and compact and thus preferred. It will be noted that levers 416 and 446 are disposed substantially at the level of the axle of assembly 424.

Lever 438 is pivoted at its upper end as at 454 to one end of a clevis means 456, the opposite end of which is pivoted as at 458 to one or the lower leg 460 of a bell crank or elbow or frame lever, generally designated 462. The elbow lever is substantially horizontally disposed and is pivoted on a generally vertical axis as at 464 intermediate its ends to a bracket 465 on the transom 400, and comprises another leg 466 angularly arranged with respect to leg 460, and pivoted at its outer end as at 468 to one end of a clevis means 470. The clevis means 470 are pivoted at their opposite end as at 472 to the upper end of a dead truck lever 474 disposed at the inner side of the associated wheel 426 and pivoted intermediate its ends as at 476 to a bracket 478 formed as part of the truck frame between the adjacent side rail 480 and transom 400. The lower end of lever 474 is pivoted as at 482 to a brake head 484 carrying a brake shoe 486 for engagement with the tread of the associated wheel 426. It will be understood that the arrangement is preferably duplicated on the opposite side of the longitudinal center line of the truck.

In operation, actuation of cylinder 404 moves piston 406 transversely of the truck to the right (Figure 9), thus moving lever 410 to the right and causing the lever 416 to pivot in a clockwise direction (Figure 7) about point 428, applying friction means 420 against the associated side of the rotor 422. Lever 410 also pivots about point 412 in a clockwise direction (Figure 9), pulling the connector 434 as well as the lever 438 to the left. Lever 438 in moving to the left causes lever 446 to rotate in a counterclockwise direction (Figure 7) about point 428 and to apply friction means 450 against the adjacent side of the rotor 422. Lever 438 also rotates in a clockwise direction (Figure 9) about point 440, rotating the fulcrum or frame lever 462 about point 464 and moving the leg 466 of said lever 462 to the right (Figures 7 and 8), whereby the clevis means 470 are also caused to move to the right and the upright dead truck lever 474 is caused to rotate about point 476 in a clockwise direction (Figure 8), applying the shoe 486 carried on head 484 against the associated wheel 426 of the wheel and axle assembly 424.

Thus it will be understood that in all three embodiments a single source of power actuates the brakes engageable with the rotor and the rotor and the brakes cooperating with the tread of the wheel, thus affording a duplex brake arrangement. It will also be noted that in all three embodiments a compact brake arrangement is afforded and that in all these embodiments the rigging is so arranged as to obtain an efficient braking action.

I claim:

1. A railway car truck having a substantially rigid structure including a side rail, a transom connected thereto, a cylinder connected to the transom, a fulcrum bracket adjacent the juncture of the transom and side rail, a wheel and axle assembly supporting said structure and including a wheel and an adjacent brake disc, a pair of brake levers each pivoted intermediate its ends on a substantially vertical axis to said bracket, friction means carried by said brake levers at one of their corresponding ends adjacent said disc for braking cooperation therewith, a pair of substantially vertical lever members connected at corresponding points to the opposite ends of respective levers, an operative connection between said lever members and said cylinder, a bell crank lever pivoted intermediate its ends on a substantially vertical axis to said transom adjacent said side rail and having a pair of angularly related substantially horizontally extending legs, one of said lever members having its upper extremity interposed between one of said legs and the inboard side of said side rail, a connection between the upper extremity of said one lever member and said one leg, a substantially vertical dead truck lever pivoted intermediate its ends to said structure inboardly of said side rail adjacent said transom, a brake head and shoe assembly carried by the lower extremity of said dead truck lever adjacent the tread of said wheel for braking engagement therewith, and an operative connection between the upper extremity of said dead truck lever and the other leg of said bell crank lever.

2. A railway car truck having a generally rigid structure including a side rail, a transom connected thereto, a fulcrum bracket adjacent the juncture of said transom and side rail, a wheel and axle assembly supporting said structure and including an axle with a wheel thereon, a brake disc adjacent said wheel, horizontal brake levers disposed at substantially the level of said axle and each pivoted intermediate its ends on an approximately vertical axis to said bracket, friction means carried by said levers at one of their corresponding ends for braking cooperation with said disc, spaced substantially vertical lever members connected below their upper ends to the opposite ends of respective brake levers, power means mounted on said transom operatively associated with said lever members, a bell crank lever on top of said transom pivoted intermediate its ends thereto adjacent said side rail, said bell crank lever having a pair of substantially horizontal, angularly arranged, vertically spaced legs, a connection between the lower of said legs and the upper end of one of said lever members, a dead truck lever pivoted intermediate its ends to said structure and located between said assembly and said transom inboardly of said side frame, friction means carried by the lower extremity of said dead truck lever adjacent the tread of said wheel for frictional engagement therewith, and a connection between the upper end of said dead truck lever and the upper of said legs.

3. In a brake arrangement for a railway car truck, a frame, a supporting wheel and axle assembly including a wheel, a brake rotor carried by said assembly, a pair of dead levers disposed at opposite sides of said rotor and pivoted intermediate their ends to said frame, friction means carried by said levers at one of their ends for braking cooperation with said rotor, a pair of auxiliary levers pivotally connected at one of their ends to the other ends of the respective dead levers, means interconnecting said auxiliary levers intermediate their ends, a power device carried by said frame operatively connected to the other end of one of said auxiliary levers, a truck lever pivoted intermediate its ends to said frame and carrying wheel-engaging means at one end, and a truck frame lever pivoted intermediate its ends to said frame and operatively connected at one end to the other end of said truck lever and operatively connected at its other end to the other end of the other of said auxiliary levers.

4. In a brake arrangement, the combination of a frame, a supporting wheel and axle assembly including a wheel and carrying the brake rotor, a dead truck lever at one side of said wheel pivoted intermediate its ends to said frame, wheel-engaging shoe means connected to one end of said truck lever, a dead lever element pivoted intermediate its ends to said frame and operatively connected at one end to the other end of said dead truck lever, brake means for said rotor comprising a pair of auxiliary levers interconnected at one of their ends, a pair of dead lever members pivoted intermediate their ends to said frame and carrying rotor-engaging friction means at one of their corresponding ends and connected at their other corresponding ends to respective auxiliary levers intermediate the ends thereof, an operative connection between the other end of one of said auxiliary levers and the other end of said dead lever element, and a power device carried by said frame and operatively connected to the other end of the other of said auxiliary levers.

5. In a brake arrangement for a railway car truck, a frame, a wheel and axle assembly supporting said frame and carrying a brake rotor, brake rigging for said rotor and wheel including substantially horizontally disposed dead levers at opposite sides of said rotor pivoted intermediate their ends to said frame and carrying rotor-engaging friction means at one of their ends, a pair of substantially vertically disposed auxiliary levers connected at their lower ends to the other ends of respective dead levers, power means carried by said frame and operatively connected to each auxiliary lever intermediate the ends thereof, one of said auxiliary levers being pivoted at its upper end to said frame, a substantially horizontally disposed dead lever element pivoted intermediate its ends to said frame and connected at one end to the upper end of the other auxiliary levers, and brake rigging for cooperation with said wheel operatively connected to the other end of said dead lever element.

6. In a brake arrangement for a railway car truck, a frame, a supporting wheel and axle assembly including a wheel, a brake disc carried by said assembly, a support structure, a dead lever pivoted intermediate its ends to said structure and carrying friction means at one end adapted to cooperate with said rotor, lever means including a substantially vertically disposed lever element connected at its lower end to the other end of said dead lever, a substantially horizontally disposed lever pivoted intermediate its ends to said frame and operatively connected at one end to the upper end of said lever element, a substantially vertically disposed lever member pivoted intermediate its ends to said frame and carrying wheel-engaging friction means at its lower end, means connecting the upper end of said lever member with the other end of said horizontally disposed lever, and actuating means operatively connected to said lever means.

7. In a brake arrangement, the combination of a truck frame including a transom, a wheel and axle assembly disposed in supporting relation to said frame and including a wheel and a brake disc rotatable therewith, a substantially horizontally disposed dead lever member fulcrumed intermediate its ends and carrying friction means at one end for braking cooperation with said disc, an operating lever pivotally connected to the opposite end of said dead lever member, a truck lever pivoted to said frame and carrying wheel-engaging friction means, a truck frame lever pivoted intermediate its ends to said frame and pivotally connected at one end to said truck lever and operatively connected at its other end to said operating lever, a power device supported on said transom, and an operative connection between said operating lever and said power device.

8. In a brake arrangement for a railway car truck, a frame, a supporting wheel and axle assembly having a wheel and carrying a brake disc, a pair of dead levers at opposite sides of said disc, a brake shoe carried by each dead lever for braking cooperation with said disc, a cylinder lever connected to each dead lever, a power device carried by said frame and operatively connected to each cylinder lever, one of said cylinder levers being pivoted to the frame, a dead truck frame lever pivoted intermediate its ends to said frame and operatively connected to the other of said cylinder levers, brake means for said wheel including a truck lever pivoted to said frame and carrying wheel-engaging friction shoe means and operatively connected to said truck frame lever.

9. In a brake arrangement for a wheel and axle assembly having a wheel and carrying a brake disc, a substantially vertical operating lever, a pair of dead levers connected at vertically spaced points at one of their ends to said operating lever, friction means carried by one of said dead levers adapted for braking engagement with said disc, a dead lever element carrying friction means at one end for cooperation with the tread of said wheel and connected elsewhere to the other end of the other of said dead levers, actuating means, and an operative connection between said actuating means and said operating lever at a point on said operating lever disposed in vertically spaced relation to the points of connection between said operating lever and said dead levers.

10. In a brake arrangement for a railway car truck, a frame, a supporting wheel and axle assembly including a wheel and carrying a brake rotor, interconnected brake rigging including dead lever means at opposite sides of said rotor and carrying friction means for engagement therewith, power means carried by said frame, auxiliary levers operatively associated with said lever means and with said power means, brake rigging for said wheel including wheel-engaging shoe means, and an operative connection between one of said auxiliary levers and said last-mentioned brake rigging including a lever element pivoted intermediate its ends to said frame and operatively connected at one end to said last-mentioned auxiliary lever and at its other end operatively connected to said rigging.

11. In a brake arrangement for a railway car truck, a truck frame, a supporting wheel and axle assembly including a wheel and a brake element rotatable therewith, a dead lever carrying friction means for braking cooperation with said element, a power device carried by said frame, an operating lever connected to said dead lever, brake rigging cooperatively associated with said wheel and including a truck lever pivoted to the frame and carrying wheel-engaging friction means, a truck frame lever pivoted intermediate its ends to said frame and having an operative connection at one end with said truck lever and at the other end with said operating lever, and an operative connection between said power device and said operating lever.

12. In a brake arrangement for a railway car truck, a frame, a supporting wheel and axle assembly including a wheel, a brake rotor carried by said assembly, a pair of dead levers pivoted intermediate their ends to said frame and arranged one at each side of said rotor and carrying at one of their ends braking means for cooperation with said rotor, auxiliary levers connected at one of their ends to the other ends of the respective dead levers and interconnected intermediate their ends, a power device connected to the other end of one of said auxiliary levers, and brake rigging for cooperation with said wheel operatively connected to the other end of the other of said auxiliary levers.

13. In a brake arrangement, a truck frame, a wheel and axle assembly including a wheel and a friction member rotatable with said wheel, brake rigging for said wheel and member including a dead truck lever at one side of said wheel carrying wheel-engaging friction means, a set of dead levers carrying friction means at opposite sides of said member, a power device carried by said frame, and an operative connection between said power device and all of said levers, said connection including lever means connected to said power device and to said set of levers, and a dead truck frame lever pivoted to said frame and operatively connected to said lever means and to said dead truck lever.

14. In a brake arrangement for a wheel and axle assembly having a wheel and a friction member rotatable with the wheel, a substantially vertical lever adjacent said wheel carrying friction means at one extremity for engagement with the tread of the wheel, a substantially horizonal dead frame lever connected at one end to said vertical lever at a point spaced from said friction means, a dead lever element carrying friction means adapted for engagement with said friction member, power means, and an operating lever operatively connected at spaced points to said lever element and to the other end of said frame lever and to said power means.

15. In a brake arrangement, the combination of a truck frame including a transom, a wheel and axle assembly disposed in supporting relation to said frame and including a wheel and a brake disc, brake rigging having cooperative relation with said wheel including a dead truck lever disposed adjacent said wheel, a dead frame lever pivoted to said frame and connected to said dead truck lever, a set of dead levers carrying disc-engaging friction means at opposite sides of said disc, and a transversely disposed brake cylinder supported on said transom and operatively connected to said frame lever and to said set of dead levers.

16. In a brake arrangement for a wheel and axle assembly having a wheel and a friction member rotatable therewith, a dead lever member carrying friction means for engagement with the tread of the wheel, a dead frame lever connected at one end to said lever member, interconnected auxiliary levers, one of which is connected to the other end of said frame lever, a dead lever element connected to each auxiliary lever and carrying friction means for engagement with said friction member, and actuating means connected to the other of said auxiliary levers.

17. In a brake arrangement for a wheel and axle assembly having a wheel, a friction member carried by said assembly for rotation therewith, a pair of dead levers pivoted on a common axis, friction means carried by respective dead levers for engagement with opposite sides of said friction member, lever means including an auxiliary lever connected to each dead lever, power means operatively associated with said lever means, brake rigging for said wheel including friction means for engaging the tread of the wheel, and an operative connection between said lever means and said rigging.

18. In a brake arrangement for a wheel and axle assembly having a wheel and a brake disc, a support, a dead lever element pivoted intermediate its ends to said support, friction means carried at one end of said dead lever element adapted for braking cooperation with said disc, a dead lever member carrying wheel-engaging shoe means, a dead frame lever connected at one end to said dead lever member, lever means including an operating lever connected to the other ends of said lever element and said frame lever, and power means connected to said lever means.

19. In a combination brake for a wheel and axle assembly including a wheel and a brake disc rotatable therewith, brake rigging for said disc including disc-engaging friction means, brake rigging for said wheel including wheel-engaging friction means, power means, and a lever connected at spaced points thereon to respective riggings and intermediate said points to said power means.

20. In a brake arrangement for a wheel and axle assembly including a brake disc rotatable therewith, brake means cooperatively associated with said disc, a pair of levers fulcrumed at one of their ends and operatively connected at their other ends to said brake means, and a power cylinder between said levers comprising a piston at each end, one of said pistons being connected to one of said levers intermediate its ends and the other of said pistons being connected to the other of said levers intermediate its ends.

21. In a brake arrangement for a railway car truck, a frame including a transom, a wheel and axle assembly supporting said frame and comprising an axle with wheels thereon and a brake disc, a power cylinder mounted on said transom above the axle, a bracket connected to the cylinder, means on said bracket affording a mounting for levers at the level of said axle, brake levers mounted on said means and carrying disc-engaging friction means, said power cylinder comprising pistons at opposite ends, and means operatively connecting each piston with the adjacent lever.

22. In a brake arrangement for a railway car truck, a frame, a cylinder mounted on said frame and including a piston stem, a wheel and axle assembly comprising a brake rotor, a pair of dead levers pivoted intermediate their ends and carrying rotor-engaging friction means at one end, and an operating linkage for said dead levers including a cylinder lever connected at one end to the other end of one of said dead levers and operatively connected intermediate its ends to the other end of the other of said dead levers and pivotally connected at its other end to said piston.

23. In a brake arrangement for a car truck comprising a frame and a wheel and axle assembly including an axle with a wheel and a brake disc adjacent each end of the axle and rotatable therewith, a cylinder having pistons at opposite ends mounted on said frame, a pair of dead levers at opposite sides of each disc pivoted intermediate their ends and carrying disc-engaging friction means at one of their ends, brake means for each wheel including wheel-engaging friction means, cylinder levers at opposite ends of said said cylinder connected at one end to respective pistons, one of said cylinder levers being connected at its other end to the other end of one of the dead levers associated with one of said discs and being operatively connected intermediate its ends to the other end of the other dead lever associated with said one disc and to the brake means associated with one of said wheels, and the other of said cylinder levers being connected at its other end to the other end of one of said dead levers associated with said other disc and intermediate its ends being operatively connected to the other end of the other dead lever associated with said other disc and to said brake means associted with the other wheel.

24. In a brake arrangement for a truck comprising a frame and a wheel and axle assembly having an axle with a wheel and a brake disc adjacent each end rotatable therewith, a cylinder mounted on the frame and comprising pistons at opposite ends, a pair of levers at each end of the cylinder interconnected intermediate their ends, brake means operatively associated with respective discs and operatively connected to one of the ends of respective pairs of levers, one of the levers of each pair being connected at its other end to the adjacent piston, and brake rigging for each wheel, one of said riggings being connected to the other end of the other lever of one of said pairs and the other of said riggings being connected to the other end of the other lever of the other pair.

25. In a brake arrangement for a railway car truck comprising a frame and wheel and axle means including a pair of spaced wheels and a pair of discs rotatable therewith, a power cylinder mounted on the frame and having a piston at each end, a pair of dead levers at opposite sides of each disc carrying disc-engaging friction means, brake means for each wheel including wheel-engaging shoe means, and brake rigging operatively connecting one of the pistons with the levers associated with one of said discs and with the brake means associated with one of said wheels, and rigging operatively connecting the other piston with the levers associated with the other disc and with the brake means associated with the other wheel.

26. In a brake arrangement for a railway car truck, a frame, a wheel and axle assembly including a wheel and a brake disc rotatable therewith, brake means operatively associated with said disc, brake rigging operatively associated with said wheel, a pair of levers interconnected at one end and operatively connected intermediate their ends with said brake means, a cylinder mounted on said frame and having a piston connected to the other end of one of said levers, and an operative connection between said rigging and the other end of the other of said levers.

27. In a brake arrangement for a wheel and axle assembly comprising a wheel and a brake disc rotatable therewith, a cylinder comprising a piston, a pair of dead levers pivoted intermediate their ends and carrying disc-engaging friction means at one end, and operating means for said dead levers comprising a pair of lever members interconnected at one of their ends and connected intermediate their ends to the other ends of respective dead levers, one of said lever members being connected at its other end to said piston, and means fulcruming the other end of the other of said members.

28. In a brake arrangement for a railway car truck, a wheel and axle assembly having a dead brake rotor, brake levers pivoted at opposite sides of the rotor and carrying friction means for engaging the rotor, a pivoted cylinder lever rotatably connected to each brake lever at one point, and a power cylinder positioned between said cylinder levers and directly connected thereto.

29. In a brake arrangement for a railway car truck including a supporting wheel and axle assembly comprising a wheel and a brake disc, a pair of pivoted brake levers at opposite sides of the disc, a brake shoe carried by each brake lever for braking cooperation with the disc, a dead cylinder lever connected to one brake lever, another cylinder lever connected to the other brake lever, a power device operatively connected to each cylinder lever and brake means for said wheel including wheel engaging friction means and operatively connected to the second-mentioned cylinder lever.

30. In a brake arrangement for a railway car truck comprising a frame and a wheel and axle assembly including an axle with a wheel and a brake disc adjacent each end thereof rotatable therewith, a cylinder mounted on the frame and comprising a piston on each end thereof, a pair of levers at each end of the cylinder interconnected at one of their ends, brake means operatively associated with respective discs and operatively connected to respective pairs of levers intermediate the ends thereof, one of the levers of each pair being connected at one end to the adjacent piston, and brake means operatively associated with respective wheels and operatively connected to the other ends of the other levers of the respective pairs.

31. In a brake arrangement for a railway car truck, a frame, a wheel and axle assembly comprising a wheel and a brake disc rotatable therewith, a pair of crossed levers pivoted at a common point intermediate their ends and carrying disc engaging friction means at one of their ends, and means for operating said crossed levers comprising a pair of lever members connected intermediate their ends to the other ends of respective crossed levers and interconnected at one of their ends, a cylinder carried by the truck and having a piston connected to the other end of one of said lever members, and means affording a fulcrum for the other end of the other of said lever members.

WALTER H. BASELT.

REFERENCES CITED

The following references are of record in the file of this patent:

UNITED STATES PATENTS

| Number | Name | Date |
| --- | --- | --- |
| 2,286,517 | Tack | June 16, 1942 |
| 2,295,244 | Tack | Sept. 8, 1942 |
| 2,416,960 | Simanek | Mar. 4, 1947 |
| 2,422,004 | Flesch | June 10, 1947 |